Aug. 19, 1947.    J. B. PARSONS    2,425,823
CONDUIT GUIDE DEVICE FOR VEHICLES
Filed Oct. 26, 1944

INVENTOR.
John B. Parsons
BY
Malcolm W. Fraser
ATTORNEY

Patented Aug. 19, 1947

2,425,823

UNITED STATES PATENT OFFICE 2,425,823

CONDUIT GUIDE DEVICE FOR VEHICLES

John B. Parsons, Toledo, Ohio

Application October 26, 1944, Serial No. 560,455

2 Claims. (Cl. 296—44)

This invention relates to conduit guides but particularly to guides for cables and tubes which extend from one point to another and are subjected to jars and vibrations and in at least a portion of their length, to recurrent flexing, and an object is to produce a guide of this character which is simple and inexpensive and adapts itself readily for purposes of installation.

Another object is to produce a vehicle door mounting for a conduit guide of the above character which not only simplifies installation but cooperates therewith in enabling flexing and sliding movements of the conduit guide when the door is opened and closed.

One application of the invention is disclosed in the following description and a clear understanding thereof may be had by reference to the accompanying drawings in which Figure 1 is an elevational view of a portion of a vehicle body and door illustrating the relative location of the invention;

Figure 1:
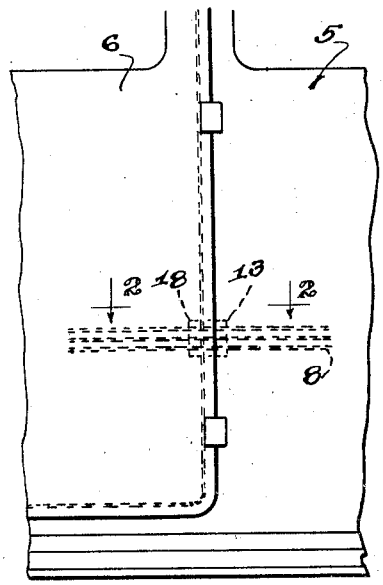

Referring to the drawings, the invention possesses great utility when employed in connection with a vehicle body 5 having a hinged door 6, as illustrated in Figure 1. Such vehicle may be an automobile, bus, aeroplane or water craft, and the invention is particularly adaptable when the door is provided with mechanism requiring electrical and/or fluid pressure connections.

Figure 4:
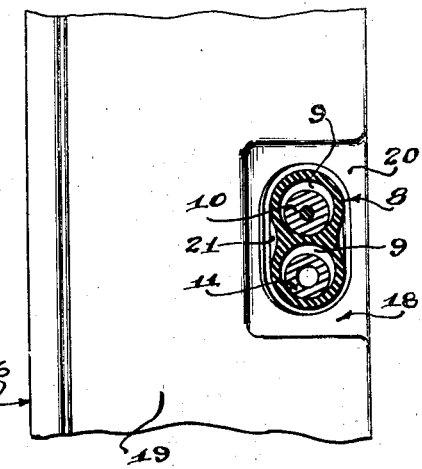
Figure 4 is an edge view of the door as indicated by the line 4—4 on Figure 2, showing the conduit guide in section.

The illustrated embodiment of the invention resides mainly in a conduit 8 of a somewhat oblong shape as illustrated in cross section in Figure 4, and is formed to provide a pair of openings 9 or closed channels adapted loosely to receive and enclose an insulated wire or cable 10 and a tube 11 for pressure fluid, such as oil. If desired, the conduit may be used to contain either pairs of wires or tubes according to the requirements of the installation. The conduit 8 may be formed of natural or synthetic rubber or a plastic material which remains flexible upon curing. The conduit prevents kinking of the wires or tubes when subjected to sharp bends and also prevents abrasion, which would wear through the insulation or damage the tube. This is advantageous where in applications of the present nature the wires or tubes are subjected to repeated bending or flexing in portions of their length. It is also particularly of advantage in facilitating assembly and installation of such wires and tubes.

Figure 3:
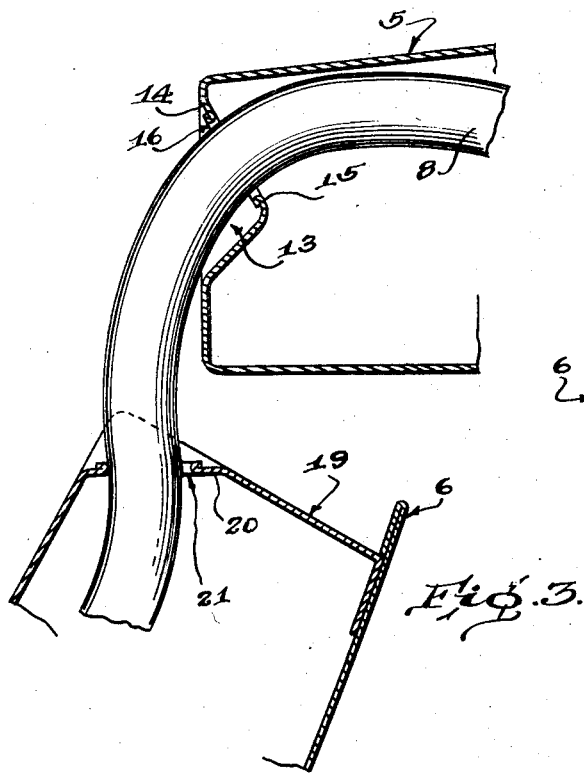
Figure 3 is a similar view showing the door in open position.

In installations such as the present in which the door is hinged in a manner to accommodate irregular body contours, the space between the door and the supporting pillar becomes increasingly wide when the door is opened, as shown in Figure 3. This requires a slidable support in at least one of the members so that the conduit will not be stretched or strained as the door is opened. In order to insure proper closing of the door and to prevent the conduit from binding or kinking, I provide a depressed area 13 in the face 14 of the door supporting pillar. One wall 15 of the depression is inclined in a horizontal plane at an angle to the face 14 in the direction of movement of the door and is provided with an opening 16 through which the conduit passes.

Figure 2:
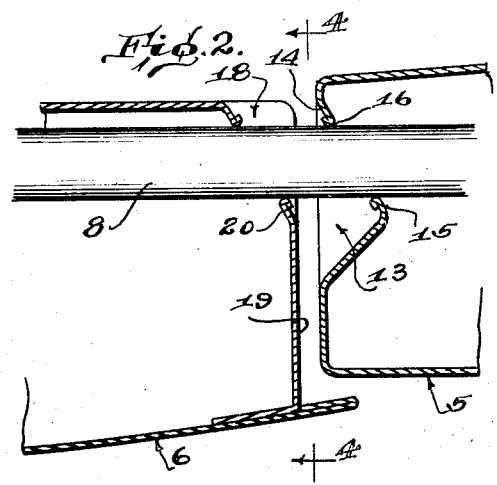
Figure 2 is an enlarged sectional plan view through the body and door taken substantially along the line 2—2 of Figure 1.

A complementary depression 18 is formed in the edges 19 of the door 6 and a wall 20 formed therein lies substantially in a plane parallel to the wall 15 when the door is in closed position (see Figure 2). An opening 21 for the conduit is provided in the wall 20. The width of the openings 16 and 21 is such that the conduit is supported without bending or pinching when the door is in closed position.

It will be noted in Figure 3 that the respective planes of the openings 16 and 21 lie generally at right angles to the direction of movement toward each other so that when the door is moved toward the closed position, the conduit is free to slide through the openings. This is partly accomplished by the fact that the width of the openings is slightly greater than the diameter of the conduit.

It should be understood that the particular configuration of the embossings or depressions above described may be varied as desired, the important factors in each instance, however, being in enabling substantially free sliding movement of the conduit with respect to the door and pillar structures and eliminating any sharp or abrupt bends in the conduit, for example when the door is in open position. Manifestly an abrupt bend instead of a gentle or gradual curve of the order shown in Figure 3 would militate against the desired sliding movement of the conduit during door opening and closing movements. Thus an embossure or depression on one of the parts would suffice in some cases and while the specific structure shown in the drawings has proved most satisfactory in service, changes may be made so long as the desiderata above indicated are achieved.

As presently employed, the wire 10 and tube 11 may be assembled in the conduit in selected lengths so that the several members are handled as a single unit, thereby greatly expediting the mounting and installation of same. The wire and tube not only tend to reinforce and strengthen the conduit, but in addition, the conduit serves as a guard for the tube and cable, thus substantially prolonging their life and usefulness.

Modifications may be resorted to within the spirit of the invention and the scope of the appended claims.

What I claim is:

1. The combination of a vehicle body pillar, a door hingedly connected to the body pillar, said pillar and door having end walls which when the door is closed lie adjacent each other in substantially parallel planes, a relatively deep depression in said pillar end wall, a relatively shallow depression in said door end wall, the depression in the body pillar having a pair of vertically extending walls forming substantially a V in cross section and the wall facing in the direction of door opening movement having a conduit-receiving aperture, the door depression having a vertically extending wall, which when the door is closed is disposed in substantially parallel relation to said facing wall, a conduit-receiving aperture in said last wall adapted to align with said first conduit in the closed position of the door, and a rubber-like conduit passing freely through said apertures.

2. The combination of a vehicle body pillar, a door hingedly connected to the body pillar, said pillar and door having end walls which when the door is closed lie adjacent each other in substantially parallel planes, a depression in each of said walls in facing relation to each other when the door is closed, the depression in the pillar end wall including a wall portion inclined in the direction of the door swinging movement and the depression in the door end wall including an inclined wall portion disposed in substantially parallel relation to said first end wall portion when the door is closed, substantially aligned apertures in said wall portions respectively, and a rubber-like conduit passing freely through said apertures.

JOHN B. PARSONS.

REFERENCES CITED

The following references are of record in the file of this patent:

UNITED STATES PATENTS

| Number | Name | Date |
|---|---|---|
| 2,136,230 | Berman et al. | Nov. 8, 1938 |
| 630,599 | Douglas et al. | Aug. 8, 1899 |
| 597,244 | Parkin | Jan. 11, 1898 |
| 2,115,811 | Hansen | May 3, 1938 |
| 2,335,696 | Rappl et al. | Nov. 30, 1943 |
| 2,187,936 | Craig | Jan. 23, 1940 |
| 1,714,950 | Earhart | May 28, 1929 |
| 2,124,037 | Lavigne | July 19, 1938 |
| 2,240,768 | Gill | May 6, 1941 |